(12) United States Patent
Kondou

(10) Patent No.: US 6,757,993 B2
(45) Date of Patent: Jul. 6, 2004

(54) WORKING VEHICLE

(75) Inventor: Masami Kondou, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 10/343,352
(22) PCT Filed: Jul. 26, 2001
(86) PCT No.: PCT/JP01/06482
§ 371 (c)(1),
(2), (4) Date: Apr. 29, 2003
(87) PCT Pub. No.: WO02/12641
PCT Pub. Date: Feb. 14, 2002

(65) Prior Publication Data
US 2003/0167660 A1 Sep. 11, 2003

(30) Foreign Application Priority Data
Aug. 2, 2000 (JP) ....................................... 2000-234756

(51) Int. Cl.[7] ............................................... B60Q 1/26
(52) U.S. Cl. ......................... 37/348; 340/684; 340/451; 340/463
(58) Field of Search ................................ 340/684, 451, 340/457, 438, 471, 472, 463; 37/348, 443, 466; 414/614, 699; 172/2; 701/50

(56) References Cited

U.S. PATENT DOCUMENTS

| | | | | |
|---|---|---|---|---|
| 3,173,136 A | * | 3/1965 | Atkinson | ............... 340/384.7 |
| 4,247,955 A | * | 1/1981 | Wiedemann | ............. 455/245.2 |
| 4,254,303 A | * | 3/1981 | Takizawa | ................... 381/107 |
| 4,603,317 A | * | 7/1986 | Gailbreath et al. | ......... 340/463 |
| 5,315,288 A | * | 5/1994 | Coward | .................... 340/463 |
| 5,940,997 A | * | 8/1999 | Toyooka et al. | ............ 371/411 |
| 6,009,643 A | * | 1/2000 | Maeba et al. | ................. 37/443 |
| 6,430,852 B2 | * | 8/2002 | Murakami | .................. 37/466 |
| 6,578,296 B2 | * | 6/2003 | Kimoto et al. | ................ 37/443 |
| 6,630,891 B1 | * | 10/2003 | Dilling | ....................... 340/902 |

FOREIGN PATENT DOCUMENTS

| | | |
|---|---|---|
| JP | 01-247233 | 10/1989 |
| JP | 11-247237 | 9/1999 |
| JP | 2001-115495 | 4/2001 |

* cited by examiner

Primary Examiner—Victor Batson
(74) Attorney, Agent, or Firm—Knobbe, Martens Olson & Bear LLP

(57) ABSTRACT

In a working vehicle which includes left and right traveling devices, a pair of hydraulic traveling motors are installed to drive the respective traveling devices, and a pair of hydraulic directional control valves are provided for the respective hydraulic traveling motors in order to control the traveling of the vehicle. A throttle valve is provided in a pilot oil-passage, and connected to a drain oil-passage after passing serially through the pair of hydraulic directional control valves below the throttle valve. A pressure switch for warning the traveling state is operated by a pilot hydraulic pressure which is pressure of oil within an oil-passage between the throttle valve and an upstream one of the left and right hydraulic directional control valves.

20 Claims, 7 Drawing Sheets

WORKING VEHICLE

This application is the U.S. National Phase under 35 U.S.C. §371 of International Application PCT/JP01/06482, filed Jul. 26, 2001, which claims priority to Japanese Patent Application No. 2000-234756, filed Aug. 2, 2000. The International Application was published under PCT Article 21(2) in a language other than English.

FIELD OF THE INVENTION

The present invention relates to a working vehicle for construction works and civil engineering works, and more particularly to a working vehicle including a traveling warning system for informing persons around the working vehicle that the working vehicle is in the traveling state is provided.

BACKGROUND ART

Conventionally, there is a working vehicle, in which a traveling warning system is provided so as to warn (usually sound an alarm) operators and passersby around the working vehicle of a traveling state of the vehicle such as a forward and rearward movement, a turn, etc.

For example, as shown in an art disclosed in the Japanese Utility Model Laid Open Gazette Sho. 61-89065, a traveling warning system is installed in a working vehicle, and constructed in such a way that a traveling lever operated by an operator is mechanically connected with an operation switch of the traveling warning system, and a warning sound generator is operated by being interlocked with the traveling lever.

Moreover, as shown in an art disclosed in the Japanese Utility Model Laid Open Gazette Sho. 61-93562, there is also a working vehicle, which is constructed in such a way that the traveling warning system is operated by detecting the pressure of a hydraulic circuit for traveling.

However, in case of the art disclosed in the Japanese Utility Model Laid Open Gazette Sho. 61-89065, there is some possibility that the earth and sand, a stone, etc. are caught in between the traveling lever and the operation switch, thereby leading to the malfunction of the traveling warning system.

In case of the art disclosed in the Japanese Utility Model Laid Open Gazette Sho. 61-93562, it is necessary that two pressure switches are provided, thereby leading to an increase of parts and costs.

When the warning is performed by sound, in consideration of the maximum noise generated in the work by the working vehicle, a sound generator generating a loud warning sound is provided in the working vehicle so as to overcome the noise. Therefore, as the case may be, the warning sound itself becomes such a noise as to bring a noise pollution to the residential section around the job site.

In order to cancel this discrepancy, there is a working vehicle enabling free cancellation of the warning by a canceling switch provided in the warning sound generator. However, once the warning is cancelled, the warning sound is not generated in case of changing into the next working or generating the warning again, so that the warning sound generator is not useful as a safety device.

DISCLOSURE OF THE INVENTION

An object of the present invention is provide a working vehicle equipped with a pair of hydraulic traveling motors for driving left and right traveling devices, a pair of hydraulic directional control valves for controlling the respective traveling devices, and a traveling warning system for warning persons around the working vehicle that the working vehicle is in a traveling state, wherein the traveling warning system is improved so as to prevent the wrong operation thereof led by the external exposure of a traveling detecting element for detecting that the working vehicle is in the traveling state, and to decrease the number of parts and costs.

In order to attain this object, in the working vehicle according to the present invention, a traveling warning system comprises a throttle valve provided in a pilot oil-passage so as to feed pilot-oil to a hydraulic pilot type control device provided in the working vehicle, and connected to a low pressure oil-passage after passing serially through the pair of hydraulic directional control valves below the throttle valve. The traveling warning system further comprises a pressure switch operated by the hydraulic pressure within an oil-passage between the throttle valve and an upstream side one of both the hydraulic directional control valves, and a warning device operated on the basis of the on-off of the pressure switch.

Due to the present invention, the pressure switch serving as a traveling detecting element of the traveling warning system is installed inside the working vehicle so as not to be exposed outward, thereby being protected from the earth and sand, a stone, etc. causing wrong operation thereof, and enhancing the reliability as a warning device. Since the pair of the hydraulic directional control valves for controlling the hydraulic traveling motors are serially disposed in the pilot oil-passage, only one pressure switch is sufficient to detect the situation that at least one of the pair of the traveling motors is driving, thereby reducing the number of parts and costs.

A second object of the present invention is to provide a working vehicle, where a traveling warning system, which alarms surrounding persons that the working vehicle is in a traveling state, with a warning sound in a suitable volume corresponding to any situation without depending on a canceling switch of the warning.

In order to attain this object, in a working vehicle according to the present invention, a traveling warning system includes a detector detecting whether the working vehicle is in the traveling state, a warning sound generating means electrically connected with an output contact of the detector, and a controller provided in the warning sound generating means.

Therefore, it is possible to control the sound volume so as to correspond to various environments around the job site. For example, the volume is decreased in a residential area etc., while the volume is increased in a work site where a loud noise is generated (or may be generated) so that the noise does not drown the warning sound. Especially, since the warning sound in the traveling warning system is not controlled by alternative steps of generation and cancellation of the warning sound, but controlled by gradual steps from a loud sound to a low sound, it is possible to prevent the generation of a noise pollution by the low warning sound even in case of the job site where the restriction of noise is expected, thereby ensuring that the traveling warning system always functions as means for a safety precaution.

Moreover, a plurality of warning sound generators having different sound volumes are provided in the warning sound generating means. The sound volume control is performed by selecting one from the plurality of warning sound generators without a complicated control circuit etc., thereby enabling an expected sound volume to be output immediately, and simplifying the warning sound generating means and reducing costs thereof.

The above and other objects of the invention will become more apparent from the following detailed description based on the accompanying drawings.

BEST MODE FOR CARRYING OUT THE INVENTION

Figure 1:
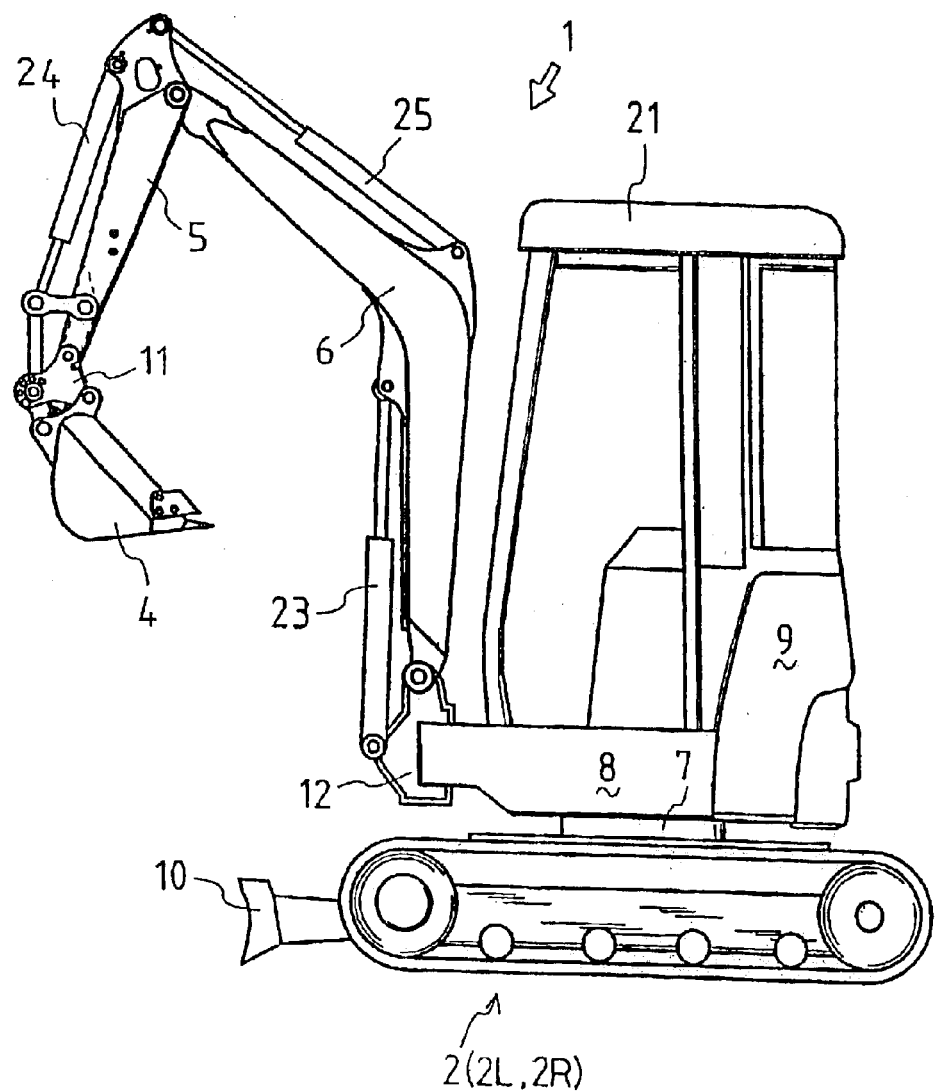
FIG. 1 is a side view of a swivel working vehicle 1 which is an example of a working vehicle, to which a traveling warning system of the present invention is applied.

In accordance with FIG. 1, explanation will be given on a general construction of a swivel working vehicle 1 as an example of a working vehicle, to which a traveling warning system of the present invention is applied.

The swivel working vehicle 1 is constructed so that a turn-table bearing 7 is disposed in the center of the upper portion of a crawler-mounted traveling device 2, which comprises a pair of left and right traveling devices, that is, a left crawler-mounted traveling device 2L and a right crawler-mounted traveling device 2R, and a swivel body 8 is laterally turnably supported by the turn-table bearing 7.

In addition, a blade 10 is provided in either front or rear of the crawler-mounted traveling device 2 so as to rotate vertically.

A bonnet 9 and a cabin 21 are provided above the swivel body 8. A lower end portion of a boom 6 is pivotally supported enabling free vertical rotation by a boom bracket 12, which is provided on a front end portion of the swivel body 8, enabling free transversal rotation. A base of an arm 5 is pivotally supported by an utmost end of the boom 6, and one end of a bucket installation member 11 is pivotally supported by an utmost end of the arm 5. An attachment device such as a bucket 4 etc. is attached to the bucket installation member 11.

A lower end of a boom cylinder 23 is pivotally supported enabling free rotation by the boom bracket 12 so that the boom 6 is rotated in the front and rear direction by the telescopic motion of the boom cylinder 23.

An arm cylinder 25 is provided in an upper portion of the boom 6 so that the arm 5 is rotated around the boom 6 by the telescopic motion of the arm cylinder 25.

A bucket cylinder 24 is provided in the base of the arm 5 so that the bucket installation member 11 is connected with an utmost end of the bucket cylinder 24 through a linkage mechanism. The bucket installation member 11 is pivotally supported by the utmost end portion of the arm 5 so that the bucket 4 is rotated around the arm 5 by the telescopic motion of the bucket cylinder 24.

Next, explanation will be given on the traveling hydraulic circuit for driving the crawler mounted traveling device 2 of the swivel working vehicle 1 in accordance with FIGS. 2–4 inclusive.

As mentioned above, in the swivel working vehicle 1 is provided the crawler-mounted traveling device 2, which comprises two traveling devices provided in the left and right sides of the vehicle body. The left and right traveling devices 2L and 2R are respectively driven by a left hydraulic traveling motor 13 and a right hydraulic traveling motor 14.

Figure 2:
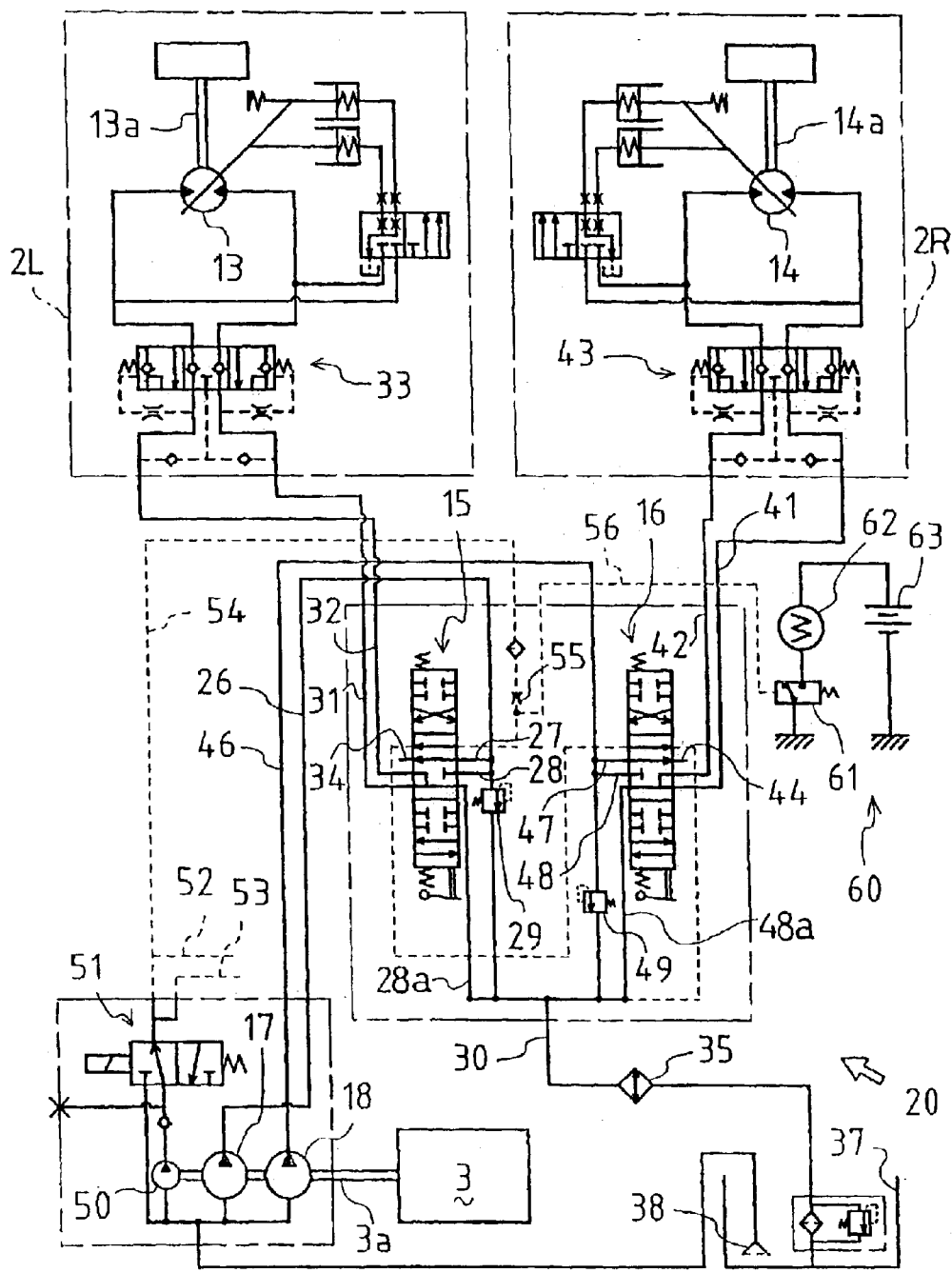
FIG. 2 is a hydraulic-circuit diagram of a traveling drive system connected with a traveling warning system 60 in the swivel working vehicle 1, when left and right hydraulic traveling motors are in neutral positions.

As shown in FIG. 2, the swivel working body 1 is provided with a traveling hydraulic circuit 20 for driving the two hydraulic traveling motors 13 and 14.

Although in the swivel working vehicle 1 is provided the crawler-mounted traveling device 2 driven by a pair of the hydraulic traveling motors 13 and 14, a traveling device of a working vehicle having the traveling warning system of the present invention is not limited to the crawler-mounted traveling device. Instead of the left and right crawler-mounted traveling devices 2L and 2R, drive wheels may be provided on the left and right sides of the vehicle body so as to be driven by the respective hydraulic traveling motors.

In the swivel working vehicle 1 are provided two hydraulic pumps 17 and 18 which share an output shaft 3a of an engine 3 serving as a common pump-driving shaft thereof. Operating-oil is supplied through a suction oil filter 38 from a common reservoir tank 37 to the hydraulic pumps 17 and 18. The left hydraulic pump 17 is fluidly connected to the left hydraulic traveling motor 13 so as to construct a driving hydraulic system for the left traveling device 2L. The right hydraulic pump 18 is fluidly connected to the right hydraulic traveling motor 14 so as to construct a driving hydraulic system for the right traveling device 2R.

In a traveling hydraulic circuit 20, an oil-passage 26 is extended from a discharge port of the left hydraulic pump 17, and an oil-passage 46 from a discharge port of the right hydraulic pump 18. The oil-passages 26 and 46 are connected to a common drain oil-passage 30 through respective relief valves 29 and 49. The drain oil-passage 30 is connected to the above-mentioned reservoir tank 37 through an oil cooler 35.

Above the relief valve 29, operating-oil supply oil-passages 27 and 28 branch off from the oil-passage 26, and are connected to a left hydraulic directional control valve 15. A traveling drain oil-passage 28a from the left hydraulic directional control valve 15 is connected to a portion below the relief valve 29 in the oil-passages 26. Above the relief valve 49, operating-oil supply oil-passages 47 and 48 branch off from the oil-passage 46, and are connected to a right hydraulic directional control valve 16. A traveling drain oil-passage 48a from the right hydraulic directional control valve 16 is connected to a portion below the relief valve 49 in the oil-passages 46.

Oil-passages 34 and 44 are extended from the hydraulic directional control valves 15 and 16 respectively, and connected to hydraulic directional control valves for switching the drive of hydraulic actuators such as the arm cylinder 25, a swing cylinder, etc. The operating-oil supply oil-passage 27 is an oil-passage for supplying operating-oil to the oil-passage 34 through the left hydraulic directional control valve 15, and the operating-oil supply oil-passage 47 is an oil-passage for supplying operating-oil to the oil-passage 44 through the right hydraulic directional control valve 16. Additionally, the oil-passages 27 and 47 are opened for free passage to the respective oil-passages 34 and 44, when the hydraulic directional control valves 15 and 16 are in a position for setting the hydraulic traveling motors 13 and 14 in neutral (hereinafter referred to as a "neutral position" of the hydraulic directional control valves 15 and 16).

The left hydraulic directional control valve 15 is connected fluidly to the left hydraulic traveling motor 13 of the left traveling device 2L through a pair of oil-passages 31 and 32, while the right hydraulic directional control valves 16 is connected fluidly to the right hydraulic traveling motor 14 of the right traveling device 2R through a pair of oil-passages 41 and 42.

As shown in FIG. 2, the left hydraulic traveling motor 13 is neutral when the left hydraulic directional control valve 15 shuts off the oil-passages 31 and 32 from the traveling operating-oil supply oil-passage 28 and the traveling drain oil-passage 28a. As shown in FIGS. 3 and 4, when one of the oil-passages 31 and 32 is connected to the traveling operating-oil supply oil-passage 28 and the other is connected to the traveling drain oil-passage 28a through the left hydraulic directional control valve 15, the operating-oil flows into the left hydraulic traveling motor 13 so as to drive it. The rotational direction of the left hydraulic traveling motor 13 is switched to either the forward traveling direction or the rearward traveling direction according to the connected oil-passage.

Figure 3:
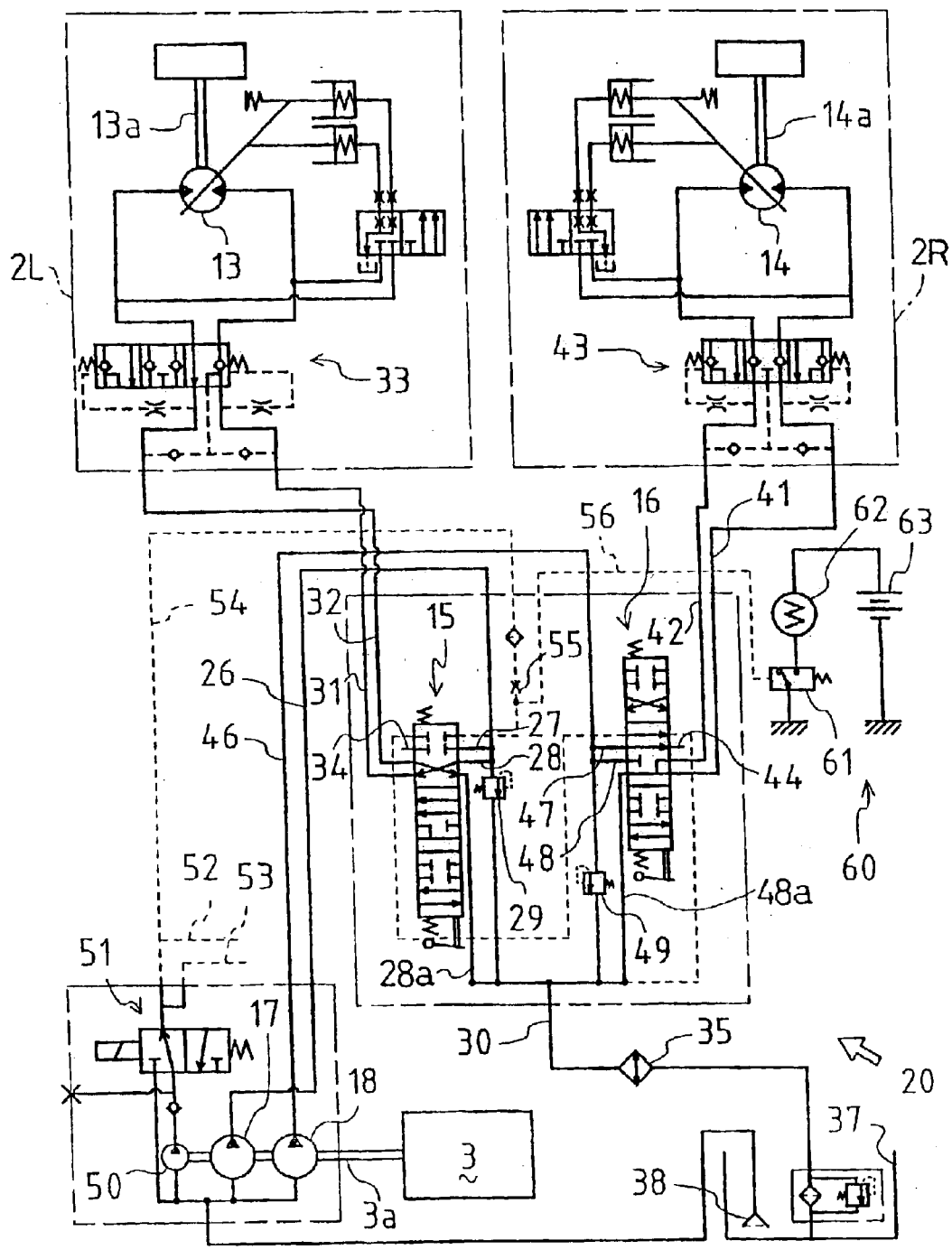
FIG. 3 is a hydraulic-circuit diagram of the same system when a left hydraulic traveling motor 13 is driven in either a frontward or rearward direction.
Figure 4:
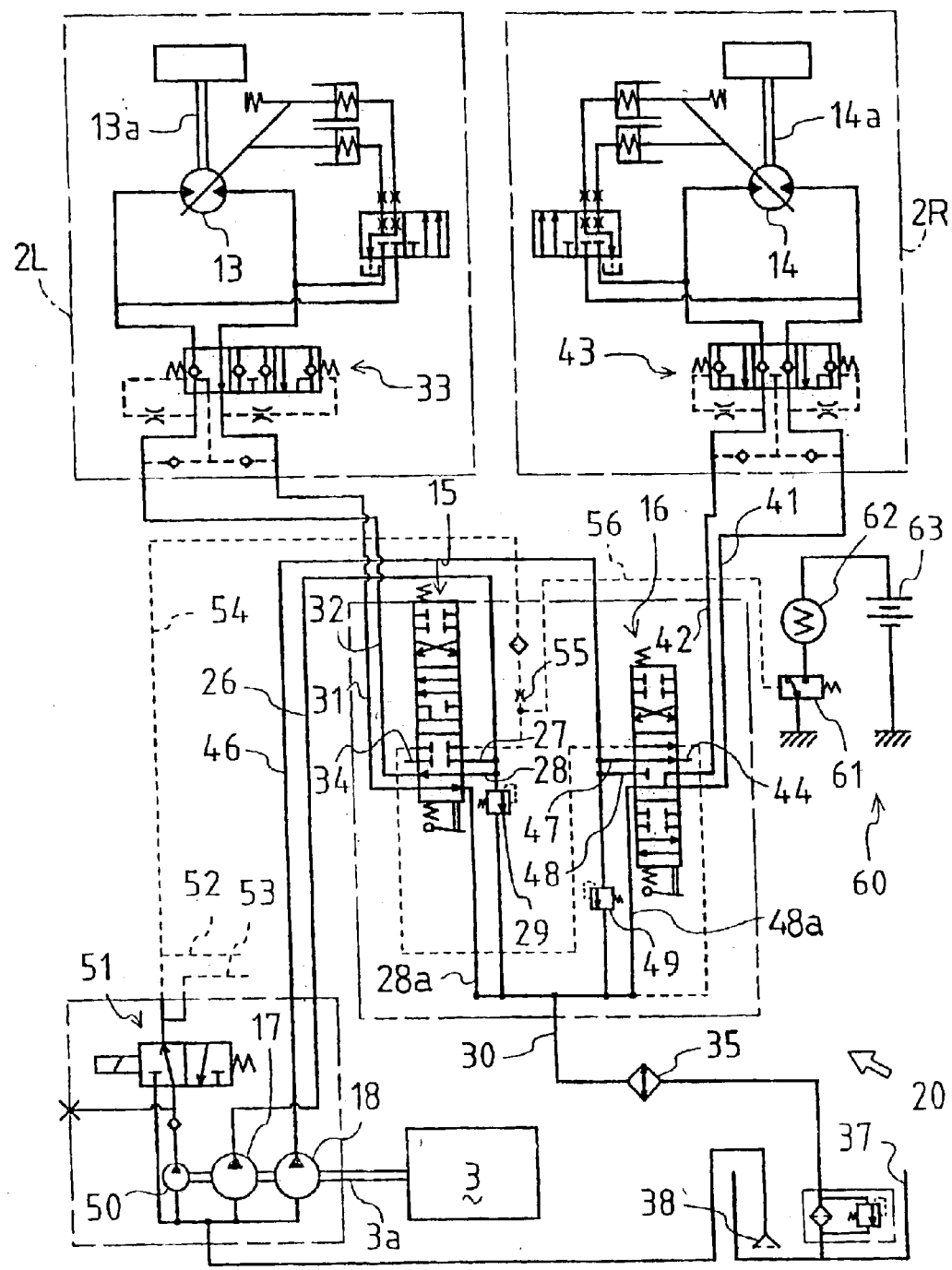
FIG. 4 is a hydraulic-circuit diagram of the same system when the left hydraulic traveling motor 13 is driven in a direction opposite to the direction thereof shown in FIG. 3.

Moreover, as shown in FIGS. 2–4 inclusive, the right hydraulic directional control valve 16 is in the neutral position, where the oil-passages 41 and 42 are shut off from the traveling operating-oil supply oil-passage 48 and the traveling drain oil-passage 48a, so that the right hydraulic traveling motor 14 is in a neutral state. In the right hydraulic directional control valve 16 as well as the left hydraulic directional control valve 15 shown in FIGS. 3 and 4, the oil-passages 41 and 42 are selectively alternately connected to the traveling operating-oil supply oil-passage 48 and the traveling drain oil-passage 48a so that the right hydraulic traveling motor 14 is driven in either the forward or rearward traveling direction.

Additionally, in the left traveling device 2L, a hydraulic pilot type directional control valve 33 is interposed in the oil-passages 31 and 32, and supplies the pressure-oil to the higher-pressure oil-passage when one of both oil-passages 31 and 32 becomes higher than the other in pressure, thereby ensuring that one way drive of the left hydraulic traveling motor 13 is maintained. In the right traveling device 2R, a hydraulic pilot type directional control valve 43 is also interposed in the oil-passages 41 and 42.

The traveling hydraulic circuit 20 also has a hydraulic circuit, which is a detector of the traveling condition in a traveling warning system 60 for warning when the swivel working vehicle 1 is in the traveling state. Next, explanation will be given on the hydraulic circuit.

In addition to the left and right hydraulic pumps 17 and 18, a pilot pump 50 is driven by rotation of the output shaft 3a of the engine 3, and inhales oil from the common reservoir tank 37 through the suction oil filter 38. Oil discharged from the pilot pump 50 passes through a solenoid-operated directional control valve 51, and then flows into three branched pilot oil-passages 52, 53, and 54. The pilot oil-passages 52 and 53 are oil-passages, through which a pilot-oil for releasing a brake and pilot-oils for valves switching operating directions of the boom cylinder, a turn motor, etc. are supplied.

The pilot oil-passage 54 is guided into the traveling hydraulic circuit 20, and connected to the common drain oil-passage 30 through the hydraulic directional control valves 15 and 16 which are disposed in series. It is arbitrary which is chosen as an upstream valve between the hydraulic directional control valves 15 and 16. In this embodiment, the left hydraulic directional control valve 15 is on the upstream side. Above the left hydraulic directional control valves 15, a throttle valve 55 is interposed in the pilot oil-passage 54 so as to limit the inflow oil quantity thereto and prevent the hydraulic pressure of the pilot oil-passages 52 and 53 from decreasing.

A pilot oil-passage 56 for a pressure switch branches off from the pilot oil-passage 54 between the throttle valve 55 and the left hydraulic directional control valves 15, and is connected to a pressure switch 61 of the traveling warning system 60.

The traveling warning system 60 comprises the pressure switch 61, a warning sound generator 62, and a power supply 63. When the pressure switch 61 is turned on, the current flows from the power supply 63 to the warning sound generator 62, thereby operating the warning sound generator 62 so as to generate warning sounds such as a buzzer which alerts operators close to the swivel working vehicle 1.

When the pilot hydraulic pressure within the pilot oil-passage 56 rises, that is, a higher hydraulic pressure than a set value is applied, the pressure switch 61 is turned on.

In this construction, as shown in FIG. 2, when the both hydraulic directional control valves 15 and 16 are in the neutral positions, the pilot oil-passage 54 is open for free passage to the drain oil-passage 30 through the hydraulic directional control valves 15 and 16 so that the discharge oil from the pilot pump 50 is drained into the drain oil-passage 30 through the pilot oil-passage 54. At this time, the pilot hydraulic pressure within the pilot oil-passage 56 is not higher than the set value so that the pressure switch 61 is turned off.

For example, as shown in FIGS. 3 and 4, when at least one of the hydraulic directional control valves 15 and 16 is switched from the neutral position to a driving set position for traveling of the vehicle either forward or rearward so that at least one of both left and right hydraulic traveling motors 13 and 14 becomes in a driving state, the pilot oil-passage 54 is blocked by the hydraulic directional control valve 15 or 16 set in the driving set position so that hydraulic pressure of the pilot oil-passage 56 is higher than the set value, thereby ensuring that the pressure switch 61 is turned on, and the warning sound generator 62 is operated so as to generate the warning sound and alert persons around the working vehicle.

The traveling warning system 60 doesn't have a switch mechanically interlocked with the traveling lever operated by an operator, but has the pressure switch 61 is which is fluidly connected to the hydraulic system for driving the left and right hydraulic traveling motors 13 and 14, and the hydraulic system is installed inside the body of the vehicle body. Therefore, the pressure switch 61 can be also installed inside the body of the swivel working vehicle 1. Thus, the pressure switch 61 is not exposed outward and protected from earth and sand, a stone, etc., whereby a malfunction thereof hardly happens, and the reliability of the traveling warning system 60 is enhanced.

The traveling warning system 60 is operated by detecting the pressure of the hydraulic system for driving the both left and right hydraulic traveling motors 13 and 14. However, in order to detect the situation that at least one of both the left and right hydraulic traveling motors 13 and 14 is driven, both the motors 13 and 14 don't have their own pressure switches respectively, but have the single pressure switch 61 which serves as a pressure detector for the traveling warning system depending upon the series arrangement of the hydraulic directional control valves 15 and 16 for supplying and discharging the operating-oil to both the traveling motors 13 and 14 on the pilot oil-passage 54, thereby reducing costs.

In accordance with FIGS. 5–9 inclusive, explanation will be given on some examples of the traveling warning system 60 generating a warning sound.

A warning sound generating means for generating a warning sound and a detector for detecting that the working vehicle is in the traveling state are installed in later-discussed various traveling warning systems. The detector for the traveling state of the working vehicle is constituted by the pilot pump 50, the pilot oil-passage 54, the pilot oil-passage 56 for the pressure switch, the throttle valve 55, the hydraulic directional control valves 15 and 16, the drain oil-passage 30, the pressure switch 61, etc. as shown in FIG. 2 etc. The pressure switch 61 serving as an output contact of the detector is shown in each figure. However, the detector is sufficient if it detects a factor for decision of operation of the warning means (that is, a factor used for judging whether the working vehicle is in traveling state or stopped). For example, the detector can be provided with pressure switches for detecting operations of the traveling motors 13 and 14, respectively, or the detector can be provided with an operation switch mechanically connected with a traveling lever operated by an operator.

Moreover, a working vehicle using each of the later-discussed traveling warning systems may be provided with a traveling driving system other than that of the above-mentioned swivel working vehicle 1. For example, it may be such a traveling driving system as to drive left and right traveling devices with a mechanical transmission. A working vehicle is applicable if it needs to warn its traveling state and is securely provided with a detector which can detect such a factor as mentioned above for judging whether the working vehicle is in traveling state as mentioned above.

Figure 5:
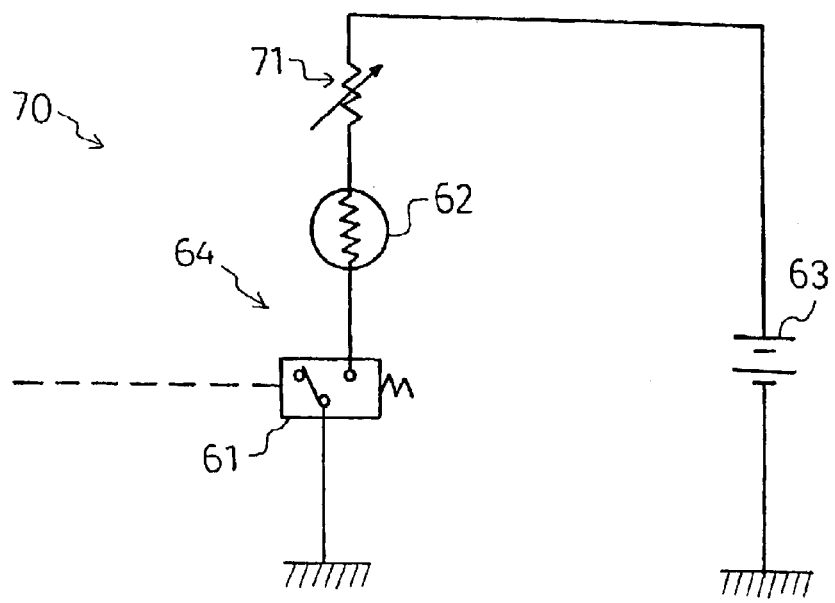
FIG. 5 is an electrical diagram of a traveling warning system 70 according to a second embodiment wherein a warning sound volume is variable.

A traveling warning system 70 shown in FIG. 5 has a sound volume control mechanism 71 in addition to the pressure switch 61, the warning sound generator 62, and the power supply 63 which constitute the traveling warning system 60. That is to say, the traveling warning system 70 has the warning sound generating means 64, which comprises the warning sound generator 62 and the sound volume control mechanism 71, and the pressure switch 61, which is the output contact of the detector for detecting that the working vehicle is in the traveling state. The warning sound generator 62 is operated when the pressure switch 61 is turned on. The sound volume control mechanism 71 comprises a variable resistor etc.

Due to the above construction, a working vehicle (for example, the swivel working vehicle 1 shown in this embodiment) provided with the traveling warning system 70 generates a warning sound which is variable in volume. Therefore, it is possible to control the sound volume so as to correspond to various environments around the job site. For example, the volume is decreased in a residential area etc., while the volume is increased in a work site where a loud noise is generated (or may be generated) so that the noise does not drown the warning sound. Especially, since the warning sound in the traveling warning system is not controlled by alternative steps of generation and cancellation of the warning sound, but controlled by gradual steps from a loud sound to a low sound, it is possible to prevent the generation of a noise pollution by the low warning sound even in case of the job site where the restriction of noise is expected, thereby ensuring that the traveling warning system always functions as means for a safety precaution.

Figure 6:
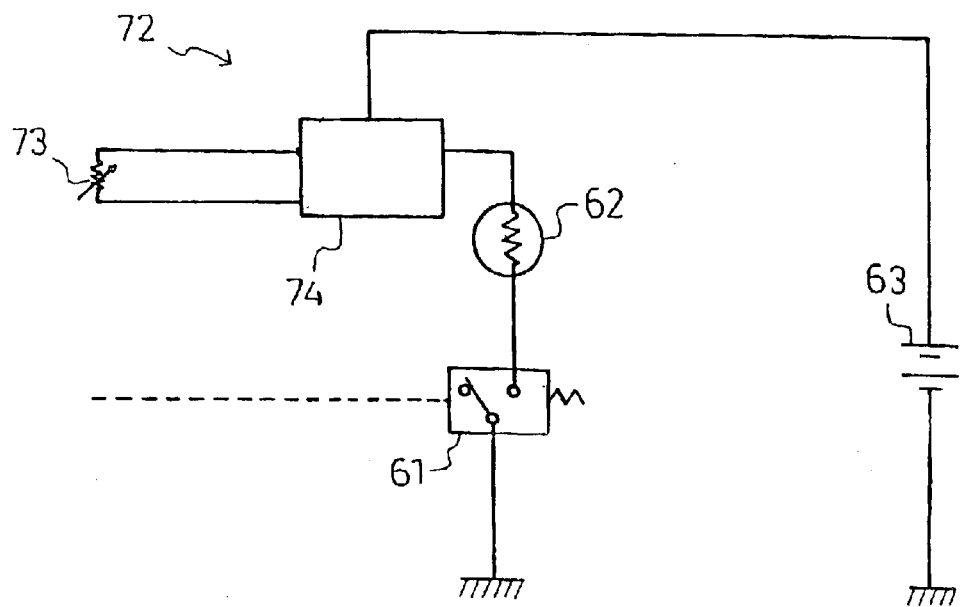
FIG. 6 is an electrical diagram of a traveling warning system 72 according to a third embodiment.

A traveling warning system 72 shown in FIG. 6 has a controller 74 connected with a sound volume control mechanism 73 which is a variable resistor, instead of the sound volume control mechanism 71 of the traveling warning system 70. The controller 74 has a PWM (pulse width modulation) circuit, wherein a pulse width is changed by controlling the sound volume control mechanism 73, thereby leading to the smooth volume adjustment of the warning sound generated from the warning sound generator 62.

Figure 7:
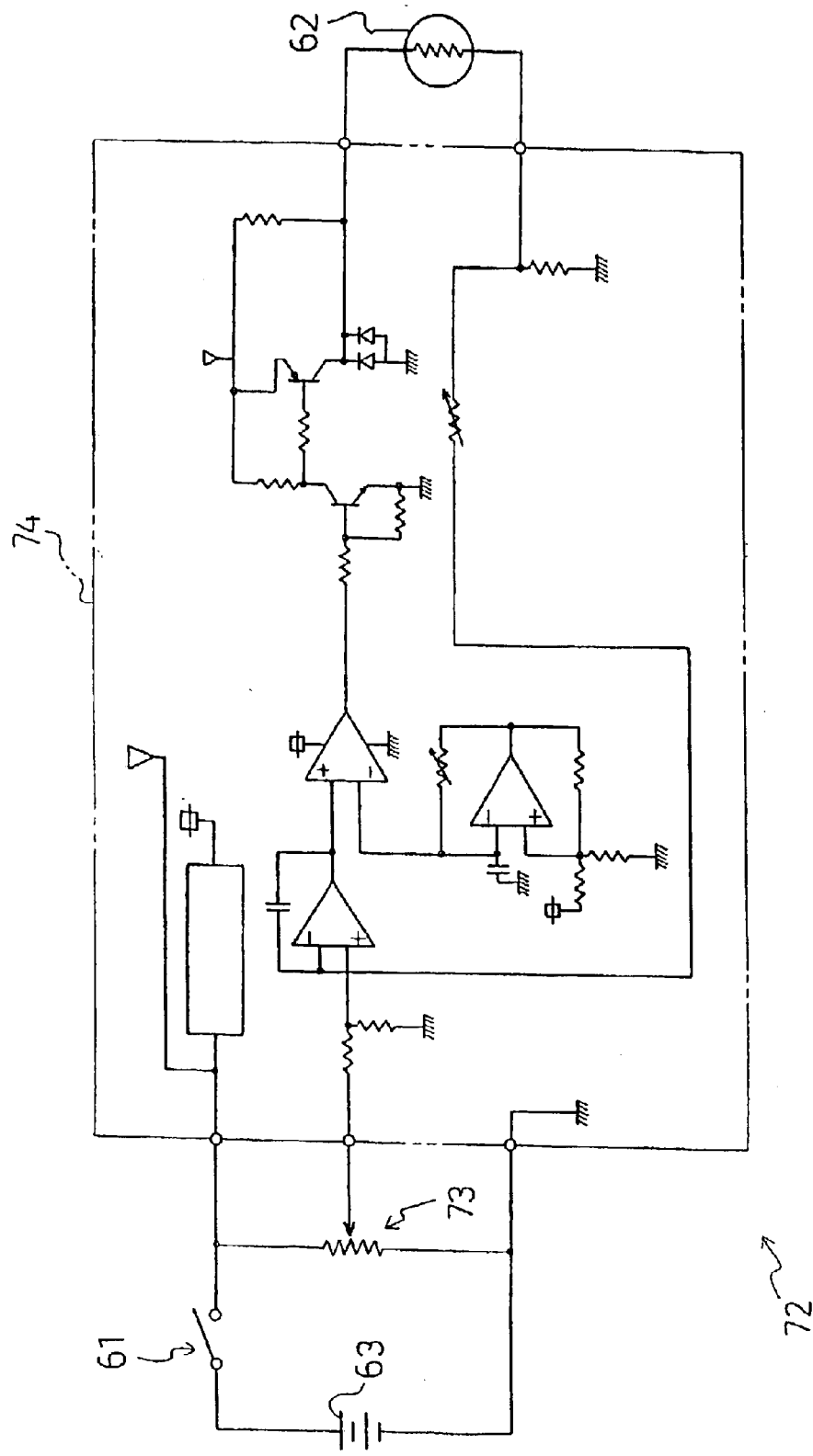
FIG. 7 is an electrical diagram of the traveling warning system 72 containing a detailed circuit diagram of a PWM circuit.

FIG. 7 is an electrical diagram of the traveling warning system 72, where the PWM circuit in the controller 74 is illustrated in detail to such a degree that an expert can understand.

Figure 8:
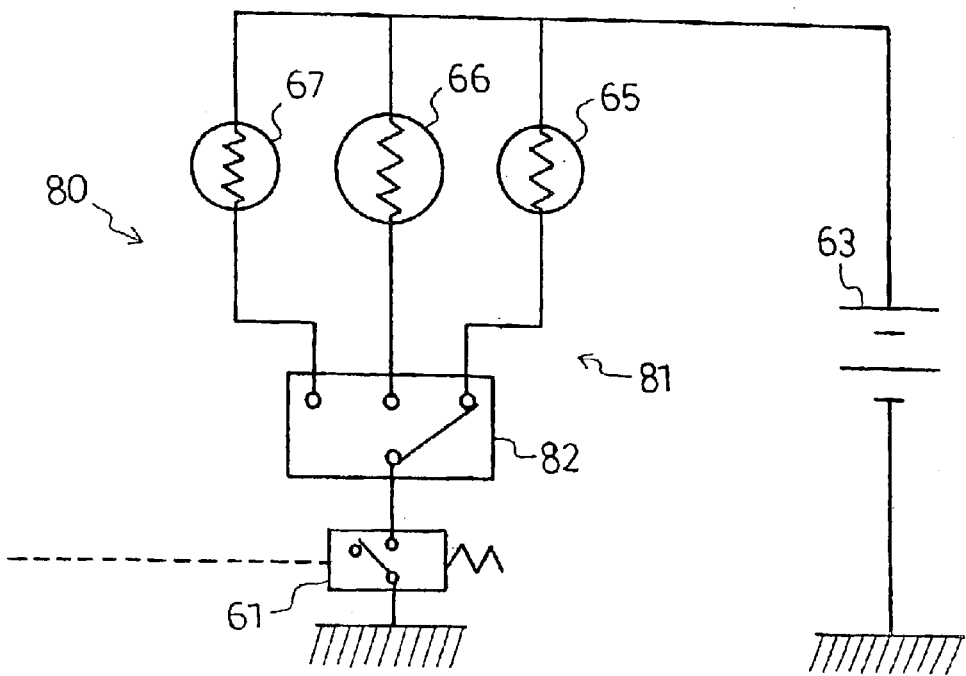
FIG. 8 is an electrical diagram of a traveling warning system 80 according to a fourth embodiment.

In a traveling warning system 80 shown in FIG. 8, a variable resistor is not used as a controller of the warning sound volume, and a warning sound generating means 81 is comprised of a plurality of warning sound generators (for example, three warning sound generators 65, 66, and 67), and a changeover switch 82 for switching operation of the warning sound generators. The warning sound volumes of the warning sound generators 65, 66, and 67 are different and the switching operation is altered one to one among the generators 65, 66 and 67 so as to increase warning sound volume step by step.

Due to this construction, an expected sound volume in correspondence to an environment around the job site can be given immediately by an operator's selective switching on one of the plural warning sound generators without a complicated control circuit etc., thereby simplifying the traveling warning system and reducing costs.

Figure 9:
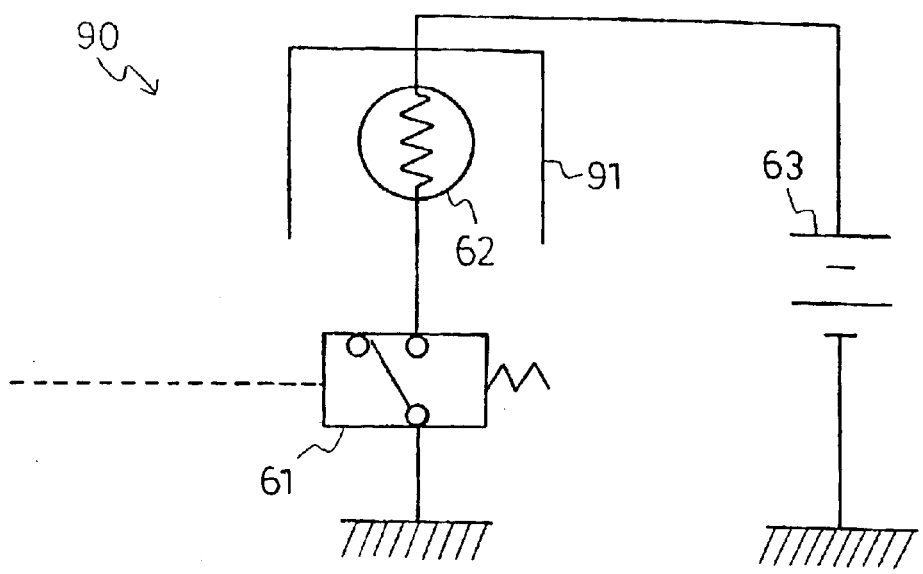
FIG. 9 is an electrical diagram of a traveling warning system 90 according to a fifth embodiment.

In a traveling warning system 90 shown in FIG. 9, the warning sound generator 62 is covered with a cover 91, whose covering degree is controlled so as to control the warning sound volume. A state of the warning sound generator 62 covered with the cover 91 is selectively determined among a full-covered state, a major-covered state, a half-covered state, etc. so as to be enabled to change step by step. By changing the covering degree of the cover 91, the volume of the warning sound transmitted from the warning sound generator 62 to outside the cover 91 is changeable from a small volume to a large volume. The warning sound volume becomes small when an operator fully covers the warning sound generator 62 with the cover 91, and the warning sound volume become large when the operator fully opens the warning sound generator 62.

Thus, similarly to the traveling warning systems 70, 72 and 80, the traveling warning system 90 provides a variable-volume warning sound in correspondence to an environment around the job site.

Any of the above-mentioned traveling warning systems, which generates a variable-volume warning sound, is provided in a working vehicle so as to disuse a canceling switch of the warning sound. For example, the sound volume, while it is set zero in usual traveling of the vehicle, may be controlled in a job site so as to give a suitable volume of warning sound.

Industrial Applicability of the Invention

According to the present invention, a working vehicle for construction work or civil engineering work is provided with a traveling warning system for informing persons around the working vehicle that the working vehicle is in a traveling state, wherein the volume of sound generated by the traveling warning system is variable in correspondence to various surrounding environments, thereby contributing for realization of works in consideration of the surrounding environments. Especially, a working vehicle including a pair of left and right traveling devices driven by respective hydraulic motors can be provided with an economical traveling warning system, which is protected from operational troubles caused by the earth and sand, a stone, etc. so as to be stable in operation.

What is claimed is:

1. A working vehicle, comprising:
   left and right traveling devices;
   a pair of hydraulic traveling motors installed to drive the traveling devices;
   a pair of hydraulic directional control valves provided for the respective hydraulic traveling motors in order to control traveling of the working vehicle;
   a pilot oil-passage for feeding pilot oil to the hydraulic directional control valves, said hydraulic directional control valves being connected in series by said pilot oil-passage;
   a single throttle valve provided in the pilot oil-passage which is located more upstream than an upstream one of said hydraulic directional control valves serially connected;
   a low pressure oil-passage connected to the pilot oil-passage which is located more downstream than a downstream one of said hydraulic directional control valves serially connected; and
   a traveling warning system comprising a pressure switch, said pressure switch being connected to the pilot oil-passage between said single throttle valve and said upstream one of said hydraulic directional control valves and being operated by hydraulic pressure within said pilot oil-passage, and said traveling warning system being operated on the basis of the on-off of said pressure switch.

2. The working vehicle as set forth in claim 1, wherein said traveling warning systems comprises
   a warning sound generating means electrically connected to said pressure switch, and
   said warning sound generating means comprises a volume controlling means to control a volume of warning sound.

3. The working vehicle as set forth in claim 2, wherein a plurality of warning sound generators having different sound volume are provided in the warning sound generating means, and the sound volume is controlled by selecting one from the plurality of warning sound generators.

4. The working vehicle as set forth in claim 1, comprising a main pilot oil-passage for feeding pilot oil to a hydraulic pilot type control device other than said hydraulic traveling motors, and wherein said pilot oil-passage diverges from said main pilot oil-passage.

5. The working vehicle as set forth in claim 1, further comprising a pilot pump connected to said pilot oil-passage for supplying pilot oil.

6. The working vehicle as set forth in claim 4, further comprising a pilot pump connected to said main pilot oil-passage for supplying pilot oil.

7. The working vehicle as set forth in claim 4, wherein said traveling warning system comprises a warning sound generating means electrically connected to said pressure switch, and said warning sound generating means comprises a volume controlling means to control a volume of warning sound.

8. The working vehicle as set forth in claim 5, wherein said traveling warning system comprises a warning sound generating means electrically connected to said pressure switch, and said warning sound generating means comprises a volume controlling means to control a volume of warning sound.

9. The working vehicle as set forth in claim 6, wherein said traveling warning system comprises a warning sound generating means electrically connected to said pressure switch, and said warning sound generating means comprises a volume controlling means to control a volume of warning sound.

10. The working vehicle as set forth in claim 7, wherein a plurality of warning sound generators having different sound volume are provided in the warning sound generating means, and the sound volume is controlled by selecting one from the plurality of warning sound generators.

11. The working vehicle as set forth in claim 8, wherein a plurality of warning sound generators having different sound volume are provided in the warning sound generating means, and the sound volume is controlled by selecting one from the plurality of warning sound generators.

12. The working vehicle as set forth in claim 9, wherein a plurality of warning sound generators having different sound volume are provided in the warning sound generating means, and the sound volume is controlled by selecting one from the plurality of warning sound generators.

13. The working vehicle as set forth in claim 2, wherein said warning sound generating means comprises a warning sound generator covered with a cover, and the volume of warning sound is controlled by adjusting covering degree of said cover to said warning sound generator.

14. The working vehicle as set forth in claim 7, wherein said warning sound generating means comprises a warning sound generator covered with a cover, and the volume of warning sound is controlled by adjusting covering degree of said cover to said warning sound generator.

15. The working vehicle as set forth in claim 8, wherein said warning sound generating means comprises a warning sound generator covered with a cover, and the volume of warning sound is controlled by adjusting covering degree of said cover to said warning sound generator.

16. The working vehicle as set forth in claim 9, wherein said warning sound generating means comprises a warning sound generator covered with a cover, and the volume of warning sound is controlled by adjusting covering degree of said cover to said warning sound generator.

17. The working vehicle as set forth in claim 2, wherein said volume controlling means comprises i) a sound volume control mechanism which is a variable resistor and ii) a controller having a pulse width modulation circuit, and the volume of warning sound is controlled by adjusting resistance of said sound volume control mechanism to change a pulse width of a signal to a warning sound generator.

18. The working vehicle as set forth in claim 7, wherein said volume controlling means comprises i) a sound volume control mechanism which is a variable resistor and ii) a controller having a pulse width modulation circuit, and the volume of warning sound is controlled by adjusting resistance of said sound volume control mechanism to change a pulse width of a signal to a warning sound generator.

19. The working vehicle as set forth in claim 8, wherein said volume controlling means comprises i) a sound volume control mechanism which is a variable resistor and ii) a controller having a pulse width modulation circuit, and the volume of warning sound is controlled by adjusting resistance of said sound volume control mechanism to change a pulse width of a signal to a warning sound generator.

20. The working vehicle as set forth in claim 9, wherein said volume controlling means comprises i) a sound volume control mechanism which is a variable resistor and ii) a controller having a pulse width modulation circuit, and the volume of warning sound is controlled by adjusting resistance of said sound volume control mechanism to change a pulse width of a signal to a warning sound generator.

* * * * *